Patented Mar. 25, 1930

1,752,174

UNITED STATES PATENT OFFICE

OLIVER ANTRUM HALL, OF SEATTLE, WASHINGTON, ASSIGNOR TO BROWN LINE PROCESS COMPANY, A CORPORATION OF WASHINGTON

PHOTOGRAPHIC CHEMICAL PROCESS AND MATERIAL

No Drawing.    Application filed May 17, 1927. Serial No. 192,165.

This invention relates to a new process for reproducing drawings from tracings, and has for its object the provision of a process which will give a beautiful and true to scale printing of a positive.

The invention also relates to the paper or cloth used to accomplish this result. This process is based upon the well-known fact in organic chemistry that the diazonium-compounds are extremely sensitive to light. Such a process has, however, been in use for the dyeing of cotton cloths, and it is to be understood that the present invention contemplates also the printing of cloths by means of such reaction.

In my process, I reproduce drawings or tracings by exposing sensitized paper under the tracing and in contact with same to light, then develop out the latent image. The way I prepare the sensitized paper and the sensitizing solution therefor is as follows:

In an Erlenmeyer or other flask of 500 cc. capacity I boil 100 cc. of water (distilled, if available). When boiling, I remove the water from the flame, and add very slowly, with constant agitation 6 cc. of chemically pure pyridine ($C_5H_5N$).

In a small beaker I prepare the following:

(B) Water_____ 10 cc.
   Add very slowly, sulphuric acid
   ($H_2SO_4$) sp. gr. 1.84 M. W.
   98.08_____ 10 cc.

The first of these chemicals (pyridine) I denominate "A", and the second solution, I denominate "B". I pour the contents of the solution "B" into the boiling hot solution "A" very slowly and with constant stirring and agitation.

I now pour the combined contents of the Erlenmeyer flask into a Pyrex or other heat resisting beaker of about one liter capacity. I then take a cube of solid ice about two and one-half or three inches along an edge, and place this in the solution. I agitate the solution until it is cooled down to about 32° F., that is 0° C., or a little lower. I stir constantly and vigorously while this solution is being cooled, and meanwhile I have prepared in a one inch test tube or like container:

(C) Sodium nitrite ($NaNO_2$)
   cp._____ 5.2 grams
   Water (ice water)_____ 25 cc.

I pour the solution "C" very slowly into the combined "A" and "B" solutions, when these have reached a temperature of not more than 32° F., and meanwhile I stir constantly and vigorously for at least ten minutes after the addition is complete. By combining solutions "A" and "B", I form pyridine sulphonic acid by the reaction between the boiling hot pyridine solution and the diluted sulphuric acid. By the addition of the sodium nitrite solution, I have diazotized at 32° F. the pyridine sulphonic acid formed by the first operation. When the diazotization has been correctly performed, no foam should be formed and no nitrogen gas should escape.

In another beaker I now prepare the following:

(D) Sodium salt of 1 amino: 2
   naphthol: 6 sulfonic:
   acid, 100% (commonly
   known as "Eikonogen"
   a photographic devel-
   oper)_____ 20 grams
   Tartaric acid (99½%
   U. S. P.)_____ 4.5 grams
   Boiling hot water_____ 100 cc.

I stir the above until thoroughly dissolved; as solution cools a paste forms.

In another beaker, I prepare the following:

(E) Antimonyl potassium tar-
   trate (tartar emetic
   U. S. P._____ 50 grams
   Water, cold_____ 100 cc.

In a graduate glass, or large test tube, I have ready the following:

(F) Nickelous sulphate ($NiSO_4$·
   $7H_2O$) solution prepared by
   dissolving 1.3 grams in each
   10 cc. water_____ 164 cc.

While vigorously stirring the diazotized pyridine sulphonic acid solution, slowly add solution "D", then the solution "E", and then the solution "F", stirring vigorously the while, and for five minutes thereafter. I conduct all of these operations in a dark room or in subdued light, since the completely mixed solution is now sensitive to light, and if light is allowed to fall upon it, nitrogen gas will be evolved, and no color coupling can occur.

The solution is now ready for coating photographic paper or cloth, and can be used immediately, or preserved for future use in a cool and dark closet. My tests have shown that the solution improves with standing to some extent. The paper coated with a solution which was eight days old, and which was used at room temperature, gave perfect results.

I prefer to coat the paper by using a new, well-washed sponge. I saturate the sponge in the solution, squeeze as dry as possible by hand and coat the paper by even strokes, so as to give a very thin film; then dry the paper in a dark closet, or before a stove or radiator, in the dark. The paper remains durable and ready for use when it is dry, and if it has not been exposed to light.

The dry coated paper is now ready for exposure under a tracing in a blue-printing machine or in sunlight. When the solution is spread upon the paper and the same is exposed to light rays, coupling occurs only in those portions upon which the light has not acted. The coupling takes place when the paper is submitted to ammonia gas. It will be seen that the paper thus treated is sensitive to ammonia before exposed to light, but is inert to ammonia after exposure.

The exposed print as taken from the printing frame or printing machine is now placed in a tight box or chamber, and exposed to the fumes of ammonia. The source of this ammonia may be a small amount of chemically pure aqueous ammonia, or may be ammonia gas from a cylinder of liquid ammonia.

The development proceeds immediately, and the intensity of the picture formed depends upon the strength of the ammonia fumes, and the length of time that the print is left in the box. The print should be left in the fuming box long enough to develop the picture clearly and distinctly. When taken from the fuming box, the lines will be deep purple color, which upon exposure to the air, will in a short time turn to the rich, drak slate-brown characteristic of these prints, they being bone dry and true-to-scale.

If for any reason it should be desired to develop the latent image prints in the wet way, that is, in a Pease continuous or Revolute continuous blue-printing machine, they may be so developed by being subjected to a spray of weak ammonia water, or of a dilute solution of sodium hydroxide. The correct strength of the solution will depend to a considerable extent upon the prior treatment as to light exposure that the prints have received, and a little experimenting will soon determine the correct strength of solution to use. I prefer, however, the gassing method of developing, because it is more efficient and preserves the true-to-scale values of the prints.

While I have described the process for the reproduction of drawings, it will be evident that it may be also used for printing from photographic negatives and positives on thin paper. Various modifications will readily occur to those skilled in the art, and all such modifications, I claim as my own if they fairly fall within the scope of the appended claims.

I claim:

1. The process of photographic printing which comprises producing a latent image on a surface sensitized to light with the reaction product of diazotized pyridine sulfonic acid with a tartaric acid solution of a sodium salt of 1 amino, 2 naphthol, 6 sulphonic acid, tartar emetic, and nickelous sulfate, and then treating the latent image so formed with an alkali.

2. The process of photographic printing according to claim 1, in which ammonia is the alkali used for developing the latent image.

3. The process according to claim 1, in which ammonia is the alkali used, and in which the ammonia in gaseous form is contacted with the print long enough to develop a purple image.

4. Light sensitive paper which has been coated with the reaction product of diazotized pyridine sulfonic acid with a tartaric acid solution of a sodium salt of 1 amino, 2 naphthol, 6 sulphonic acid, tartar emetic and nickelous sulfate.

5. The process of preparing a light sensitive solution, suitable for coating paper for photographic purposes, which consists in diazotizing and aqueous solution of pyridine sulfonic acid at approximately 0° C., then reacting the product of said reaction in turn with an aqueous tartaric acid solution of a sodium salt of 1 amino, 2 naphthol, 6 sulphonic acid, an aqueous solution of tartar emetic, and an aqueous solution of nickelous sulfate, the two latter operations being conducted in a light which is devoid of actinic rays.

6. The process which comprises diazotizing pyridine and reacting the diazotized compound with a color coupling agent.

7. The process which comprises diazotizing pyridine sulfonic acid, and reacting the diazotized compound with a color coupling agent.

8. A step in the process of reproducing drawings from tracings which comprises reacting diazotized pyridine sulphonic acid, with a solution of a sodium salt of 1 amino, 2 naphthol, 6 sulphonic acid.

9. The process of preparing a light sensitive solution suitable for coating paper for photographic purposes, which comprises diazotizing an aqueous solution of pyridine sulphonic acid at approximately 0° C. and reacting the product of said reaction in turn with an aqueous solution of sodium salt of 1 amino, 2 naphthol and 6 sulphonic acid, a color coupling agent and an aqueous solution of a nickelous sulphate.

10. The process of preparing a light sensitive solution suitable for coating papers for photographic purposes which comprises diazotizing an aqueous solution of pyridine sulphonic acid at approximately 0° C. and then reacting the product of said reaction with an aqueous tartaric acid solution of a color coupling agent, and an aqueous solution of a nickelous sulphate.

OLIVER ANTRUM HALL.